United States Patent [19]
Hatada et al.

[11] Patent Number: 5,093,154
[45] Date of Patent: Mar. 3, 1992

[54] PROCESS FOR PREPARING A MONOMOLECULAR BUILT-UP FILM

[75] Inventors: Motoyoshi Hatada; Kazufumi Ogawa, both of Osaka; Hideharu Tamura, Tokyo, all of Japan

[73] Assignees: Matsushita Electric Industrial Co., Ltd.; Japan Atomic Energy Research Institute, both of Japan

[21] Appl. No.: 402,183

[22] Filed: Sep. 5, 1989

[30] Foreign Application Priority Data

Sep. 5, 1988 [JP]  Japan .................................. 63-221754

[51] Int. Cl.⁵ ............................................. B05D 3/06
[52] U.S. Cl. ..................... 427/43.1; 427/36; 427/38; 427/54.1; 427/333; 427/44; 427/443.2
[58] Field of Search ............... 427/36, 54.1, 38, 333, 427/377, 379, 44, 443.2, 43.1

[56] References Cited

U.S. PATENT DOCUMENTS

| | | | |
|---|---|---|---|
| 4,539,061 | 9/1985 | Sagiv | 156/278 |
| 4,761,316 | 8/1988 | Ogawa | 427/54.1 |
| 4,778,724 | 10/1988 | Bragole | 427/54.1 |
| 4,968,524 | 11/1990 | Ogawa et al. | 427/36 |
| 4,992,300 | 2/1991 | Ogawa et al. | 427/44 |
| 5,008,127 | 4/1991 | Ogawa | 427/36 |

FOREIGN PATENT DOCUMENTS 61-122925  6/1986  Japan .

*Primary Examiner*—Shrive Beck
*Assistant Examiner*—Roy V. King
*Attorney, Agent, or Firm*—Lowe, Price, LeBlanc & Becker

[57] ABSTRACT

A process for producing a monomolecular built-up film of monomolecular layers of a silane surfactant is described. In the process, the silane surfactant is chemically adsorbed on a hydrophilic surface of a substrate and is subjected to irradiation of a high energy beam or plasma treatment in an active gas atmosphere to activate the monomolecular layer. This activated layer is further adsorbed with the silane surfactant to form a built-up film. The beam irradiation or plasma treatment may be effected in a desired pattern. The beam irradiation or plasma treatment and the further adsorption are repeated until the desired number of the monomolecular layers is obtained.

10 Claims, 5 Drawing Sheets

ELECTRON BEAM

ELECTRON BEAM

ELECTRON BEAM

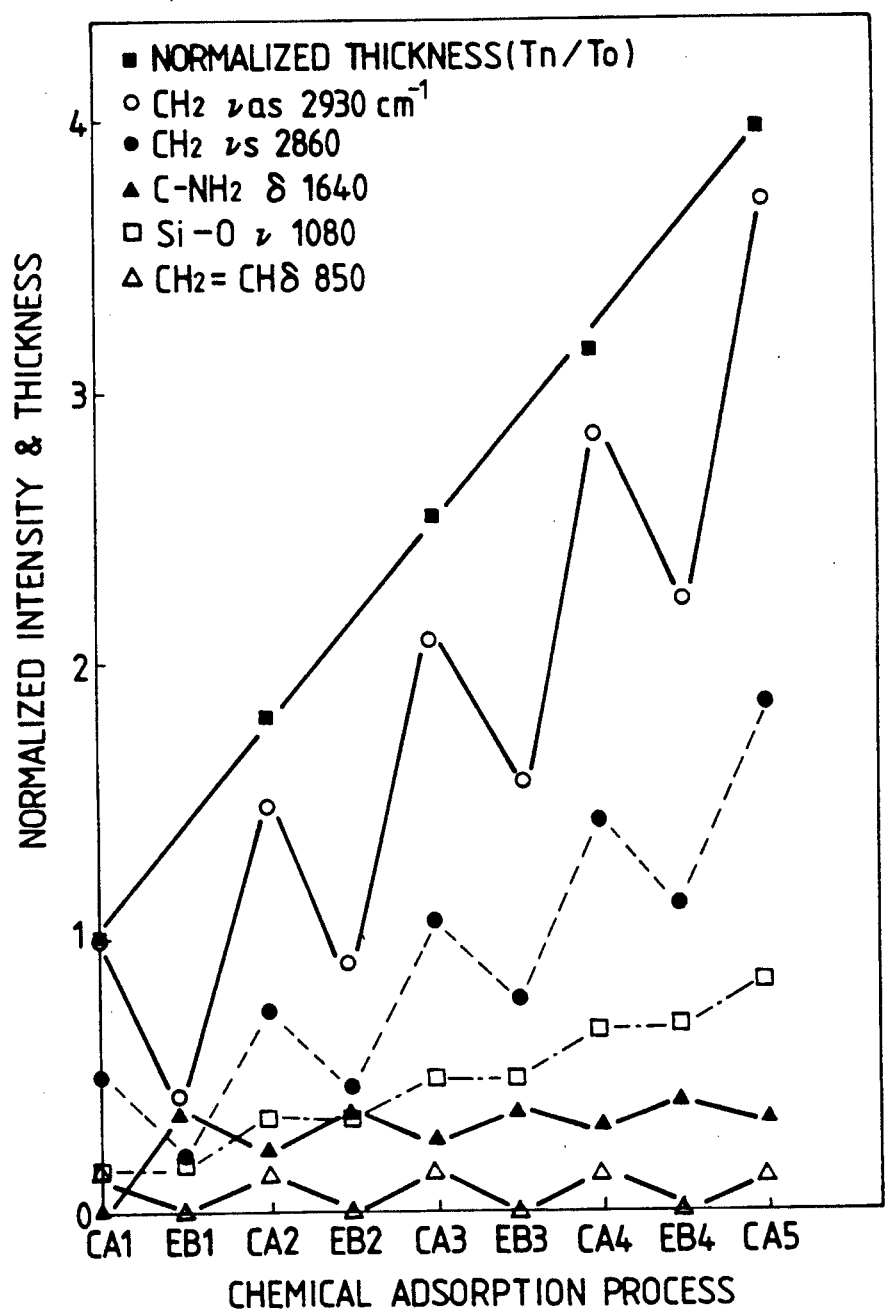

PROCESS FOR PREPARING A MONOMOLECULAR BUILT-UP FILM

BACKGROUND OF THE INVENTION

1. Field of the Invention

This invention relates to a process for producing a monomolecular built-up film of the chemisorption type which has been developed for use as functional electronic devices such as molecular elements.

2. Description of the Prior Art

For the deposition of monomolecular layers, there is typically known a method of producing Langmuir-Blodgett (LB) built-up films. In this method, amphiphilic substances or amphiphiles having both a hydrophobic group and a hydrophilic group and dissolved in organic solvents are spread on a water surface and gathered to form a monomolecular layer, followed by evaporation of the solvent. The molecules on the water surface are gathered by means of a barrier or barriers. In this state, a substrate is vertically moved with respect to the resultant monomolecular layer while adding a given surface pressure. This is repeated to build up a plurality of monomolecular layers on the substrate.

The LB method is considered as one of promising methods of enabling one to construct layered structures in the recent development of molecular devices wherein specific functions are imparted to molecules. According to the LB method, a monomolecular layer having a thickness in the order of several tens angstroms can be formed. Built-up films of the layers are readily obtained. However, the monomolecular layers in the built-up film are not chemically bonded with one another, resulting in unsatable characteristic properties. In addition, the film obtained by the LB method is not so good with respect to the density of the molecules with an attendant problem that defects such as pinholes are involved in great number.

The built-up film formed according to the LB method is not considered to show its inherent properties to a full extent.

J. Sagiv proposed in U.S. Pat. No. 4,539,061 a process wherein a monolayer is formed on a substrate by chemisorption and is chemically modified on the entire surface thereof by the use of reagents. Another monolayer is built up on the entire surface of the previously formed monolayer. The desired number of monolayers is formed by repeating the chemisorption and chemical modification. In this process, however, selective formation of monomolecular layers one on the other with good bonding is not shown. Thus, it is not possible to build up a monolayer selectively at the same interface.

SUMMARY OF THE INVENTION

It is an object of the invention to provide a process for producing a highly dense built-up film of monomolecular layers with good properties wherein individual monomolecular layers are chemically bonded through intermolecular reactions.

It is another object of the invention to provide a process for producing a built-up film of monomolecular layers wherein the built-up ultrathin film is selectively formed on a substrate by firm bonding thereto.

It is a further object of the invention to provide a process for producing a built-up film of organic monomolecular layers on a given portion of a substrate whereby an element having a specific function can be made on the given portion of the substrate.

The process of producing a built-up film of monomolecular layers according to the invention comprises:

(a) providing a substrate having a hydrophilic surface layer capable of adsorption reaction with a silane surfactant;

(b) subjecting the silane surfactant to chemical adsorption on the surface layer in a non-aqueous solvent thereby forming a first monomolecular layer on the surface layer;

(c) subjecting the first monomolecular layer either to irradiation of a high energy beam or to plasma treatment in an atmosphere of a gas necessary for modifying a group of the silane surfactant into a group reactive with the silane surfactant; and (d) subjecting the silane surfactant to reaction with the first monomolecular at the modified group thereby forming a second monomolecular layer through bonding with the first monomolecular layer.

The desired number of the monomolecular layers is attained when repeating the step (c) and (d) of the above process. Moreover, the irradiation of a high energy beam or the plasma treatment may be effected the entire surface of the first monomolecular layer. If the irradiation or plasma treatment is effected in a desired pattern, selective formation of the second and subsequent monomolecular layers is possible. The reactive site of the hydrophilic surface layer on the substrate is preferably made of OH groups.

The silane surfactant should preferably be a chlorosilane compound of the general formula, $A-(CH_2)_n-SiCl_3$ wherein A represents a $CH_2=CH-$ or $CH\equiv CH-$ group and n is an integer. The group represented by A is preferably a $CH\equiv CH-$ group and n is preferably an integer of from 10 to 20.

The gas in the atmosphere may be air, oxygen, nitrogen or ammonia which depends on the type of modification of the silane compound. Usually, oxygen or nitrogen is used.

As will be apparent from the above, in the process of the invention, a monomolecular layer of the silane surfactant is chemically adsorbed on the substrate to form a monomolecular layer thereon. Subsequently, the monomolecular layer is subjected to irradiation of an energy beam or plasma treatment in a desired pattern thereby modifying the functional A group of the silane surfactant for further chemical adsorption reaction with the silane surfactant. Accordingly, a pinhole-free built-up film can be obtained. When the above steps are repeated, the desired number of the monomolecular layers which are intermolecularly bonded can be obtained.

BRIEF DESCRIPTION OF THE DRAWINGS

FIG. 10 is a graphical representation of a normalized intensity or thickness in relation to the number of adsorption and electron beam irradiation steps. In FIGS. 9 and 10, CA1 to CA5, respectively, represent first to fifth chemical adsorption steps and EB1 to EB4, respectively, represent first to fourth electron beam irradiation steps.

DETAILED DESCRIPTION AND EMBODIMENTS OF THE INVENTION

The process of the invention is described with reference to the accompanying drawings and particularly, to FIGS. 1 to 8.

Figure 1:
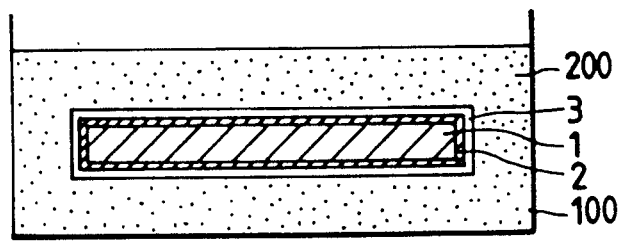
FIG. 1 is a schematic view of chemical adsorption of a silane surfactant on a substrate.

In FIG. 1 there is shown a container 100 having a solution 200 for adsorption, in which a substrate 1 made, for example, of Si is placed. The Si substrate used has been subjected to formation of an $SiO_2$ film 2 on the surface by thermal oxidation or chemical vapor deposition thereby rendering the surface hydrophilic. The solution 200 is separately prepared, for example, by dissolving a silane surfactant of the formula, $CH_2=CH(CH_2)_n-SiCl_3$, wherein n has the same meaning as defined before, in a mixed solvent of 80% of n-hexadecane, 12% of carbon tetrachloride and 8% of chloroform at a concentration of from $2\times10^{-3}$ to $5\times10^{-2}$ mols/liter. The hydrophilic substrate is immersed in the solution for about 30 minutes as shown in FIG. 1. Since the $SiO_2$ layer is formed on the Si substrate, the bond shown below is formed on the surface

Figure 2:
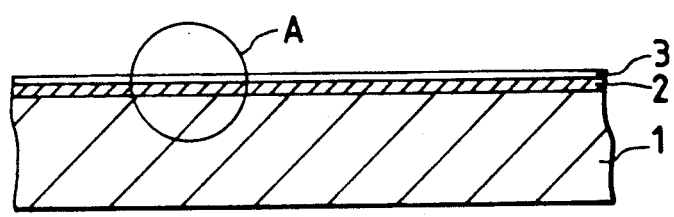
FIG. 2 is a schematic sectional view of the substrate obtained after the chemical adsorption in FIG. 1.
Figure 3:
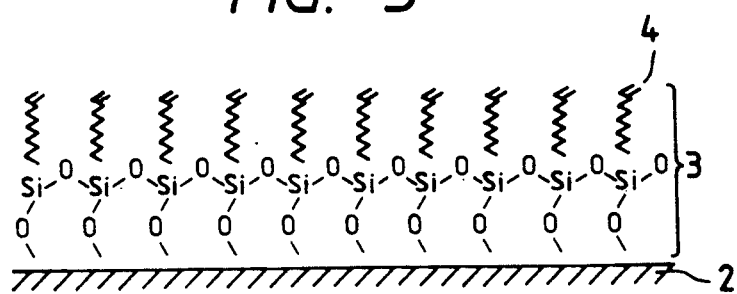
FIGS. 3, 4, 5, 6, 7, and 8 are, respectively, illustrative views of a sequence of modification of a silane surfactant by irradiation of an energy beam and subsequent chemical adsorption.
Figure 4:
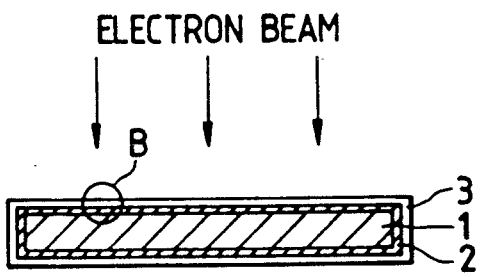
Figure 5:
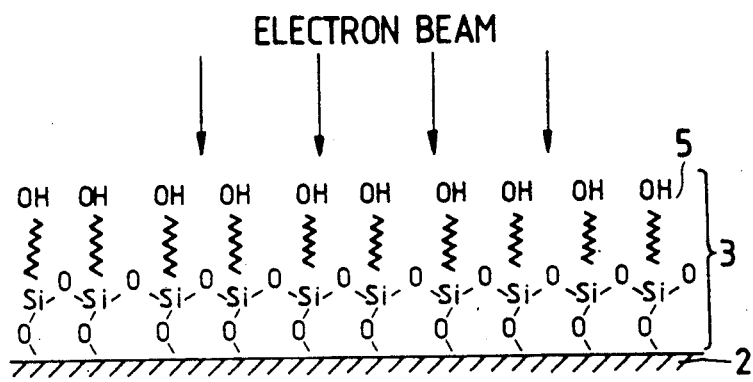
Figure 6:
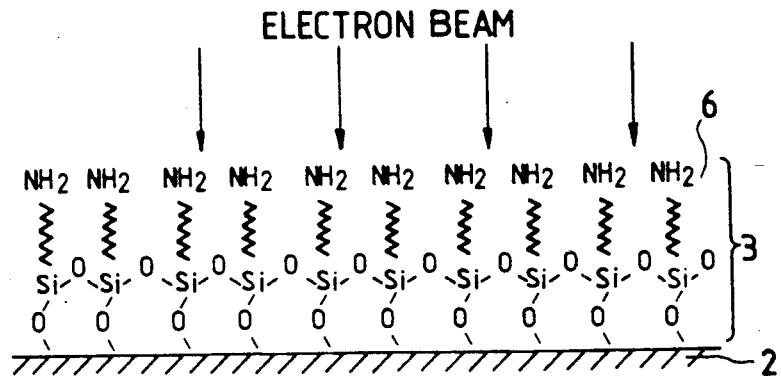
Figure 7:
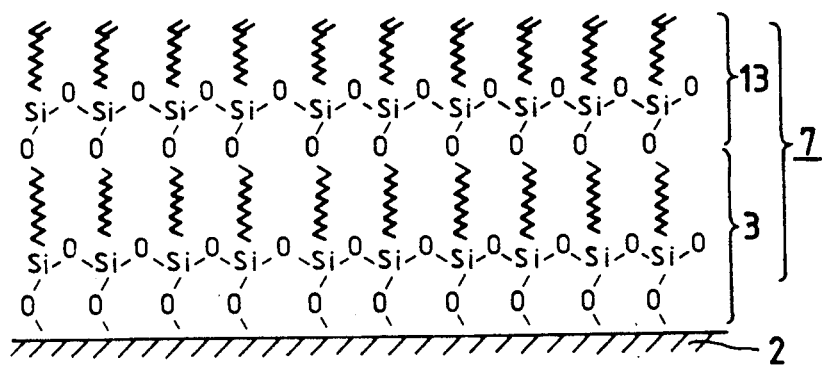
Figure 8:
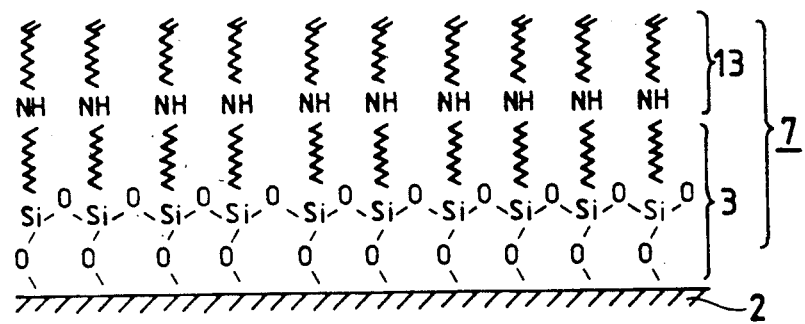

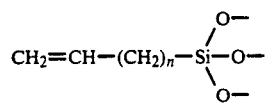

thereby forming a monomolecular layer 3 of the silane surfactant with a thickness of from 20 to 30 angstroms. Part of the substrate 1 having the $SiO_2$ layer 2 and the monomolecular layer 3 is shown in FIG. 2. FIG. 3 is an enlarged view at A of FIG. 2. In FIG. 3, the vinyl group of the silane surfactant is indicated as 4.

Next, the monomolecular layer 3 on the substrate 1 is subjected, for example, to selective irradiation of an energy beam such as an electron beam, an X-ray, a gamma-ray, an UV ray or an ion beam. This irradiation is effected in an atmosphere containing oxygen, nitrogen, $NH_3$ or the like. Air may also be used for this purpose. For example, 5 Mrad of an electron beam is selectively irradiated on the monomolecular layer so that a hydroxy group (—OH) 5 (FIG. 5) or an amino group (—$NH_2$) 6 (FIG. 6) or an imino group (=NH) is added to the vinyl group of the silane surfactant. The type of addition group depends on the type of gas used in the atmosphere. The formation of the hydroxy group 5 or amino group 6 has been experimentally confirmed by the Fourier transform infrared spectroscopy (FTIR). Presumably, the reaction of the following formula (1) or (2) are considered to proceed by the electron beam irradiation:

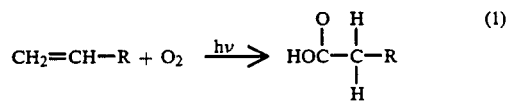

wherein R and R', respectively, represent a residue of the silane surfactant.

The addition of —OH or $NH_2$ group to the vinyl group may be likewise performed when the monomolecular layer 3 is subjected to plasma treatment in an atmosphere containing $O_2$ or $N_2$.

After the addition reaction, the silane surfactant is again chemically adsorbed by immersion of the substrate in the reaction solution as used for the first adsorption, thereby causing the SiCl group of the silane surfactant and the OH or $NH_2$ group to react with each other. As a result, a built-up film 7 of the monomolecular layers 3, 13 which are intermolecularly bonded with each other can be formed on the substrate 1. This is particularly shown in FIGS. 7 and 8 which, respectively, relate to bonds with OH groups and $NH_2$ groups.

Figure 9:
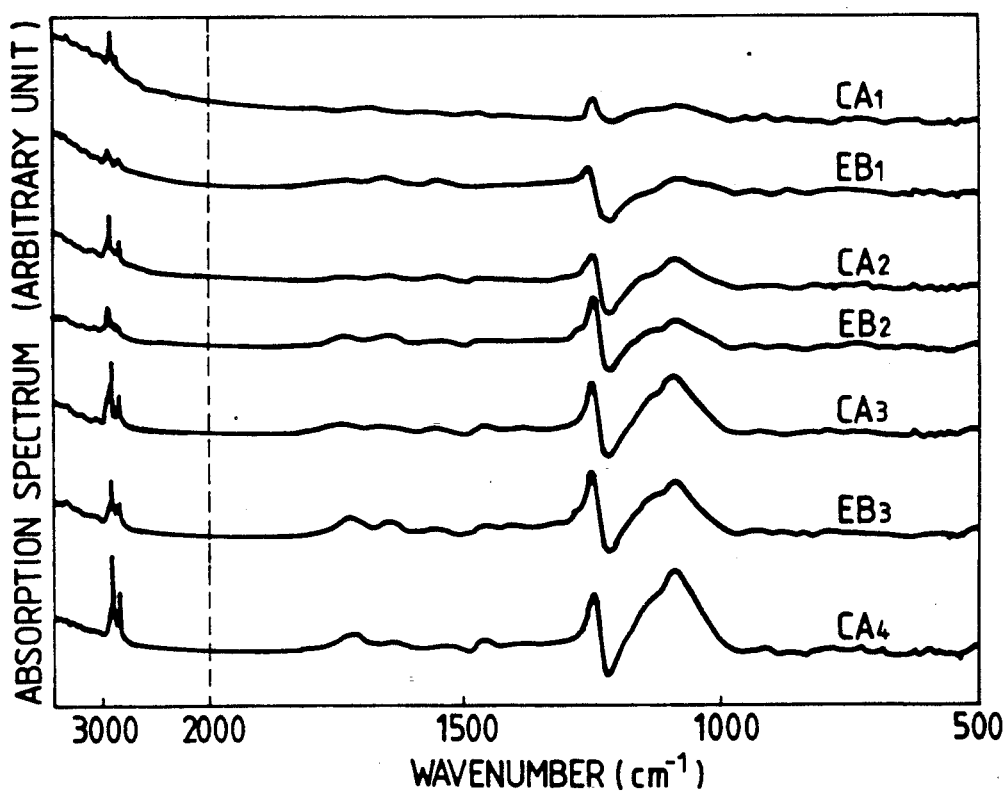
FIG. 9 is a spectral chart of the Fourier transform infrared spectroscopy of a built-up film of monomolecular layers of a silane surfactant obtained by repeating chemical adsorption and electron beam irradiation in a nitrogen gas.

In FIGS. 9 and 10, there are, respectively, shown the variation in the FTIR spectrum and the variations in the thickness and absorption peak.

The thickness was measured using an ellipsometer. From FIGS. 9 and 10, evidence is given that the monomolecular layers are built up.

In the above embodiment, the silane surfactant having a vinyl group and a chlorosilyl group is used. The use of a silane having an acetylene group instead of the vinyl group such as, for example, $HC\equiv C-(CH_2)_{17}-SiCl_3$ gives similar results, which has been confirmed by the FTIR analysis.

Moreover, when diacetylene derivatives, e.g. $CH_2=CH-(CH_2)_n-C\equiv C-C\equiv C-(CH_2)_m-SiCl_3$ wherein n and m are, respectively, an integer, are used, crosslinkage across the monolayer of the derivative is possible by UV irradiation thereby imparting electric conductivity along the layer plane.

In the above embodiment, the substrate used is made of Si but any materials having a hydrophilic group on the surface are usable for the above purposes. Examples of such materials include various metal oxides, glasses, organic polymers, and organic and inorganic crystals.

Although not specifically stated, it is possible in the practice of the invention to form a built-up film of a number of monomolecular layers which are obtained by repeating the chemical adsorption step of the silane surfactant and the addition step of the OH or $NH_2$ group. The process of the invention is advantageous over the Sagiv's process in that a monomolecular film can be formed selectively only on portions where irradiated. Selective irradiation of energy beams on a given portion enables one to form an element having a certain function at the portion.

As will be clear from the foregoing description, according to the process of the invention which makes use of the combination of the molecular assist by energy beam and self-assembling properties of organic molecules, there is formed a highly dense organic thin film or built-up film on the hydrophilic surface of a substrate. The built-up film is made of monomolecular layers which are intermolecularly bonded with each other and is substantially free of pinholes and uniform in thickness. The process is very effective in producing a molecular element which needs handling at molecular level. The built-up film obtained by the process has the possibility of applications to various fields of passivation membranes of semiconductor devices, lubricants of magnetic recording mediums, dielectric films of capacitors, liquid crystal-aligning films of liquid crystal devices and the like.

What is claimed is:

1. A process for manufacturing a built-up film of monomolecular layers which comprises:
   (a) providing a substrate having a hydrophilic surface layer which can be subjected to an adsorption reaction with a silane surfactant;
   (b) subjecting the silane surfactant to chemical adsorption on the surface layer in a non-aqueous solvent thereby forming a first monomolecular layer on the surface layer;
   (c) subjecting the first monomolecular layer to irradiation of a high energy beam or to plasma treatment in an atmosphere of a reactive gas selected from the group consisting of air, $O_2$, $N_2$ and ammonia for modifying a group of the silane surfactant into a group reactive with the silane surfactant; and
   (d) subjecting the silane surfactant to reaction with the first monomolecular layer at the reactive group thereby forming a second monomolecular layer through bonding with the first monomolecular layer.

2. A process according to claim 1, wherein the steps of (c) and (d) are repeated until the desired number of the monomolecular layers are built up.

3. A process according to claim 1, wherein the first monomolecular layer is subjected to irradiation of the high energy beam or plasma treatment selectively in a desired pattern.

4. A process according to claim 1, wherein the gas is nitrogen whereby an $NH_2$ group is formed as the reactive group.

5. A process according to claim 1, wherein the gas is oxygen whereby an OH group is formed as the reactive group.

6. A process according to claim 1, wherein said silane surfactant is a compound of the formula, $CH_2CH-(CH_2)_n-SiCl_3$, wherein n is an integer.

7. A process according to claim 6, wherein n is an integer of from 10 to 20.

8. A process according to claim 1, wherein said silane surfactant is a compound of the formula, $HC\equiv C-(CH_2)_n-SiCl_3$, wherein n is an integer.

9. A process according to claim 8, wherein n is an integer of from 10 to 20.

10. A process according to claim 1, wherein said silane surfactant is a compound of the formula, $CH_2=CH-(CH_2)_n-C\equiv C-C\equiv C-(CH_2)_m-SiCl_3$ wherein n and m are, respectively, an integer.

* * * * *